United States Patent [19]

Neuhof et al.

[11] Patent Number: 5,522,118
[45] Date of Patent: Jun. 4, 1996

[54] HINGE COMPRISING TWO HINGE PARTS ROTATABLY CONNECTED WITH EACH OTHER VIA SUPPORT WALLS

[75] Inventors: Markus Neuhof, Ehringshausen; Udo Münch, Sinn, both of Germany

[73] Assignee: Rittal-Werk Rudolf Loh GmbH & Co. KG, Germany

[21] Appl. No.: 305,459

[22] Filed: Sep. 13, 1994

[30] Foreign Application Priority Data

Sep. 14, 1993 [DE] Germany .................. 43 31 123.7
Feb. 5, 1994 [DE] Germany .................. 44 03 593.4

[51] Int. Cl.⁶ ........................................ E05D 5/10
[52] U.S. Cl. .................. 16/386; 16/389; 403/71; 403/68; 361/827; 174/86
[58] Field of Search .............. 16/386, 387, 388, 16/389, 390, 391, 392, 221; 403/71, 70, 68; 361/827; 174/86, 68.3

[56] References Cited

U.S. PATENT DOCUMENTS

| | | | |
|---|---|---|---|
| 3,028,445 | 4/1962 | Hurley | 174/86 |
| 3,781,037 | 12/1973 | Czajkowski | 174/86 |
| 4,109,097 | 8/1978 | Berry | 174/86 |
| 4,140,357 | 2/1979 | Wolz et al. | 174/86 |
| 5,248,850 | 9/1993 | Laney | 174/86 |

FOREIGN PATENT DOCUMENTS 3034013 4/1982 Germany.

*Primary Examiner*—Maurina T. Rachuba
*Assistant Examiner*—Chuck Y. Mah
*Attorney, Agent, or Firm*—Speckman, Pauley & Fejer

[57] ABSTRACT

A hinge comprising two hinge parts rotatably connected to each other by support walls, on each of which a support arm of a suspension device for a control device or the like is disposed. The hinge axis extends perpendicular to the longitudinal axis of the support arms. Simplified assembly of the hinge and the simple installation of cables or the like is achieved where the hinge parts, which respectively are at right angles to each other, have a support arm fastening wall and a support wall, both of which are provided with a cable passage. The support arm fastening wall and the support wall of one hinge part are connected to each other in one piece by lateral walls which terminate even with the free end of the support arm fastening wall and the free end of the support wall and form an assembly chamber behind the support arm fastening wall and the support wall which is accessible through an opening. The support arm fastening wall has fastening receivers into which fastening screws can be inserted from the direction of the assembly chamber and screwed into screw receivers of the support arms.

42 Claims, 2 Drawing Sheets

HINGE COMPRISING TWO HINGE PARTS ROTATABLY CONNECTED WITH EACH OTHER VIA SUPPORT WALLS

BACKGROUND OF THE INVENTION

1. Field of the Invention

This invention relates to a hinge consisting of two hinge parts rotatably connected to each other by support walls, on each of which a support arm of a suspension device for a control device or the like is disposed, wherein the hinge axis extends perpendicular to the longitudinal axis of the support arms.

2. Description of Prior Art

A hinge of this type is taught by German Patent Publication DE 30 34 013 A1. The upper and lower hinge parts are respectively formed of one housing half and are rotatably connected to each other by a roller bearing. Hollow profiled sections can be inserted into an opening of the housings and can be fixed in place therein by fastening screws. A flexible hose is inserted into the two housing halves and is pushed into the ends of the hollow profiled sections. It is used in this way for passing through cables inserted into the hollow profiled sections.

Such a hinge is very elaborate in its design and consists of many individual parts. This results in a large outlay for parts and assembly. Furthermore, the insertion and passage of cables through the hinge is not possible in a simple way because the cable can easily become jammed in the portion of the hose where it turns.

SUMMARY OF THE INVENTION

It is an object of this invention to provide a hinge of the type discussed hereinabove which requires only a few, simple parts and allows simplified assembly and a simple installation of cables or the like.

This object is attained by a hinge in accordance with one embodiment of this invention having hinge parts which respectively are at right angles to each other and comprise a support arm fastening wall and a support wall, both of which are provided with a cable passage. The support arm fastening wall and the support wall of one hinge part are connected to each other in one piece by lateral walls which terminate even with the free end of the support arm fastening wall and the free end of the support wall and form an assembly chamber behind the support arm fastening wall and the support wall which is accessible through an opening. The support arm fastening wall has fastening receivers into which fastening screws can be inserted from the direction of the assembly chamber and screwed into screw receivers of the support arms.

The opening permits access to the assembly chambers through large spaces and, in this way, to the backs of the support arm fastening walls and the support walls. Consequently, the hinge bearing can be easily inserted and mounted. The fastening screws can be inserted into the fastening receivers in a simple way through the openings from the rear of the support arm fastening walls. The openings permit the use of a screwing tool. The lateral walls of the hinge parts provide a reinforcement of the support arm fastening wall and the support wall, which are disposed perpendicular to each other, so that high loads can also be absorbed. The insertion of a cable into a finished hinge is possible in a simple manner. In the process, the cable is pushed through the support arms and passed out of the opening of the one hinge part at the end of the support arm. From there it can be simply turned around by hand and pushed through the cable passage of the support wall.

This type of operation wherein the opening is used as an assembly aid for the cable can subsequently also easily be employed when passing the cable through the other hinge part. In this way, it is possible to install a cable or the like quickly and simply with a few motions of the hand. This is possible even if a hinge has already been fastened on a wall or a ceiling.

In accordance with one embodiment of this invention, the support arm fastening wall of one of the hinge parts comprises a flat connecting surface used as a connecting flange for fastening the hinge on a wall or machine body. As a result, the hinge can be used as a wall connection hinge. The flat connecting surface is then fastened flat on the wall or a machine body. In this case, the support arm fastening wall comprises fastening receivers, for example, into which the fastening screws can be inserted and screwed into the threaded receivers of the wall or the machine body.

In accordance with another embodiment of this invention, the openings of the hinge parts are closed off by covers, thereby providing a dust-protected encapsulation of the bearing parts in cooperation with the side walls. An encapsulation sealed against dust and moisture is achieved in accordance with another embodiment of this invention by an additional seal placed between the cover and the hinge parts.

A simple connection between the covers and the hinge parts is achieved where the covers can be locked together and/or screwed together with the hinge parts.

A hinge with hinge parts which are simple to manufacture and to process is provided in accordance with one embodiment of this invention where the hinge parts have a pipe-shaped annular section in the area of their support walls, which is closed off by the support wall, or where the hinge parts have a square hollow profiled section in the area of the support walls, which is closed off by the support wall.

In accordance with this embodiment, the hinge parts can be cut to size from a semi-finished material, for example, and can be finished with a few processing steps.

The hinge parts are produced by a casting method and can be cast simply and without undercuts because of their pipe-shaped geometry.

In accordance with one embodiment of this invention, the support arm fastening walls of the hinge parts respectively form a receptacle on the exterior in which the end of the support arms can be fastened, thereby making it possible to preposition the support arms on the hinge parts so that a simple screw connection from the direction of the rear of the support arm fastening wall is possible.

In accordance with one preferred embodiment of this invention, the hinge is formed of a retaining ring and bearing rings. A neck of the retaining ring is inserted into the cable passage of the one hinge part and is positively supported thereon by a collar. Threaded receivers are cut into the retaining ring and also cut, aligned therewith, into the support wall of the other hinge part. The two hinge parts can be connected to each other by fastening screws. The retaining ring with its collar as the rotatable part can be simply manufactured. A stable connection between the two hinge parts is provided by the positive seating of the collar on the support wall, so that high loads can be absorbed.

Screwing the other hinge part together with the retaining ring is possible in a simple way, because the opening of the other hinge part allows easy access to the screw receivers in the support wall.

In accordance with another preferred embodiment of this invention, three bearing rings are used in the hinge which, in the vertical direction, respectively form a guided support between the collar of the retaining ring and the support wall of the one hinge part, between the support wall of the one hinge part and the support wall of the other hinge part and, in the horizontal direction, between the retaining ring and the support wall of the hinge part.

In accordance with one embodiment of this invention in which pivotability of the hinge is limited, pivoting of the one hinge part in relation to the other hinge part is limited by means of a stop.

In accordance with a preferred embodiment, the stop is affixed on one support arm fastening wall of the one hinge part on the side facing away from the support arm, and one or two necks are in fixed connection with the other hinge part and cooperate with the stop.

In accordance with one embodiment comprising only one neck, a maximum twist of approximately 360° of the two hinge parts in respect to each other is permitted. This prevents the cable, which is passed through the cable passages of the two hinge parts, from becoming twisted and damaged. If two necks are provided, the two hinge parts can be maximally turned by a fixedly defined angle.

Simplification of assembly is achieved where the stop is embodied as an angle piece having fastening receivers into which fastening screws can be inserted which can be screwed into the screw receivers of the support arms. In this way, the angled piece can be screwed to the support arm in one assembly step together with the hinge part.

In accordance with another embodiment of this invention, the neck(s) is (are) embodied as screws which are screwed into threaded receivers of the retaining ring. In this way, the stop can be fastened to the one hinge part. The retaining ring is fixedly connected to the other hinge part so that the limitation of the rotary movement in the area of the hinge bearing is possible.

In accordance with yet another embodiment of this invention, the screws and the stop are closed off by a cover having an annular neck which is inserted into the retaining ring. The cover and the neck have a passage for leading the cable through. As a result, the inserted cables are prevented from being clamped between the neck and the stop and becoming damaged.

If the cover has a radial slot, it is possible to insert it later in an already assembled hinge. The installed cables are inserted through the slot into the passage. Then the annular neck can be inserted into the retaining ring.

In order to be able to install, remove or change the necks later, the hinge in accordance with one embodiment of this invention comprises a cover having a recess through which the necks are individually accessible.

BRIEF DESCRIPTION OF THE DRAWINGS

These and other objects and features of this invention will be better understood from the following detailed description taken in conjunction with the drawings wherein.

DESCRIPTION OF THE PREFERRED EMBODIMENTS

Figure 1:
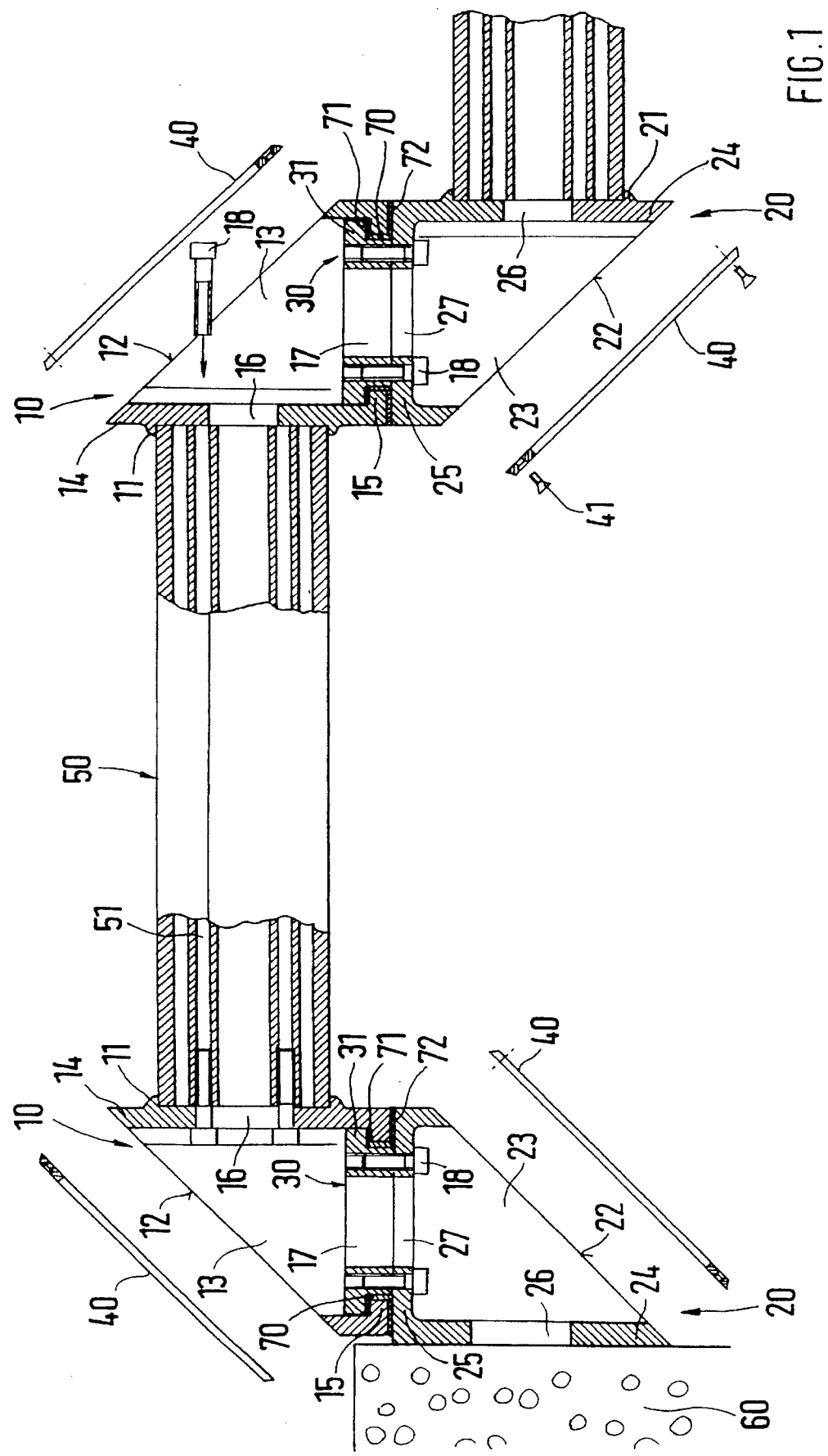
FIG. 1 is a longitudinal cross-sectional view of a suspension device with two hinges and two support arms in accordance with one embodiment of this invention.

FIG. 1 shows two hinges in accordance with this invention to which support arms have been screwed. A hinge comprises two hinge parts 10, 20, which are pivotably connected to each other by a hinge bearing. The hinge parts 10, 20 have a support arm fastening wall 14, 24 and a support wall 15, 25. The support arm fastening wall 14, 24 extends perpendicular to the support wall 15, 25 and is connected in one piece to it. The support arm fastening wall 14, 24 is connected by lateral walls to the support wall 15, 25, wherein the lateral walls terminate even with the free end of the support arm fastening wall 14, 24 and the free end of the support wall 15, 25. In this way, an assembly chamber 13, 23 is formed behind the support arm fastening wall 14, 24 and the support wall 15, 25, which is accessible through opening 12, 22. The openings 12, 22 can be closed by a cover 40 of sheet steel or plastic. The hinge parts 10, 20 have fastening receivers for attaching the cover 40 to them, into which fastening screws 41 can be inserted and screwed into screw receivers of the hinge parts 10, 20 The hinge parts 10, 20 in the area of the support walls 15, 25 can form, for example, a pipe-shaped annular section or a square hollow profiled section.

The support arm fastening wall 14, 24 and the support wall 15, 25 are provided with openings used as cable passages 16, 26, 17, 27. A receptacle 11, 21 is formed on the side of the support arm fastening wall facing outwardly from the hinge. The receptacle 11, 21 is formed by an annularly projecting neck. The surface enclosed by the annular neck is flat so that the flat end of a support arm 50 can be placed flush on it. The cable passage 16, 26 is disposed in the center of the surface enclosed by the annular neck. The support arms 50 comprise an oval closed hollow profiled section, the two vertical lateral walls of which are connected by means of two arc-shaped connecting elements. The lateral walls of the hollow profiled section are vertically oriented so that great flexural and torsional strength in case of a vertical load is assured. Longitudinally oriented screw conduits 51 are cut into the interior of the support arm 50. The connected support arm 50 is centered in the correct position by the receptacles 11, 21, so that the screw conduits 51 are aligned with fastening receivers of the support arm fastening wall 14, 24. Fastening screws can be inserted from behind through the opening 12, 22 and the assembly chamber 13, 23 and can be screwed into the screw conduits 51.

A collar 31 of a retaining ring 30 is supported on an interior step of the support wall 15 of the first hinge part 10. The retaining ring 30 is inserted into the assembly chamber 13 through the opening 12 and is guided by a neck through the cable passage 17. Threaded receivers are cut into the retaining ring 30. The support wall 25 of the second hinged part 20 is disposed against the support wall 15 of the first hinged part 10 in such a way that the screw receivers in the support wall 25 of the second hinge part 20 are aligned with the threaded receivers of the retaining ring 30.

Fastening screws 18 can then be inserted into the screw receivers through the opening 22 of the second hinge part 20 and can be screwed into the threaded receivers of the retaining ring 30. Three bearing rings 70, 71, 72 are used for seating. The bearing ring 71 is disposed between the collar 31 of the retaining ring 30 and the support wall 15. The bearing ring 70 is embodied in the form of a conduit gland and inserted into the cable passage. The bearing ring 70 thus is laterally supported on the retaining ring 30.

The third bearing ring 72 is disposed between the support walls 15, 25 of the first and second hinge part 10, 20. The hinge shown at the right in FIG. 1 is used for the rotatable connection of two support arms 50, wherein the support arms 50 can be pivoted in respect to each other around an axis extending perpendicular to the longitudinal axis of the support arms 50.

However, it is also possible to employ the hinge as a wall connecting hinge. In this case, as shown by the hinge at the left of FIG. 1, the support arm fastening wall 24 of the second hinge element 20 is provided with a flat connecting surface. The wall connecting hinge can therefore be fastened in screw receivers of the wall 60 by fastening screws which are inserted into corresponding fastening receivers of the support arm fastening wall 24. A cable can then be inserted through the cable passage 26 of the support arm fastening wall 24 into the assembly chamber 23 of the second hinge part 20 from the direction of the wall. The cable is then passed through the opening 22 and pushed through the cable passages 27 and 17 of the second and the first hinge parts 20 and 10 into the assembly chamber 13 of the first hinge part 10. From there it can be pulled out of the opening 12 of the first hinge part, turned through the cable passage 16 of the support arm fastening wall 14 of the first hinge part and inserted into the cable conduit of the support arm 50 until it emerges from the cable passage 16 of the hinge shown at the right in the drawing. Passage of the cable through this hinge takes place in the above described manner.

In accordance with this embodiment, the hinge can be mounted and screwed to the wall 60, and installation of the cable can take place later. In this way it is possible, if desired, to later install additional cables or other supply lines, such as compressed air hoses, without the hinge having to be removed.

Figure 2:
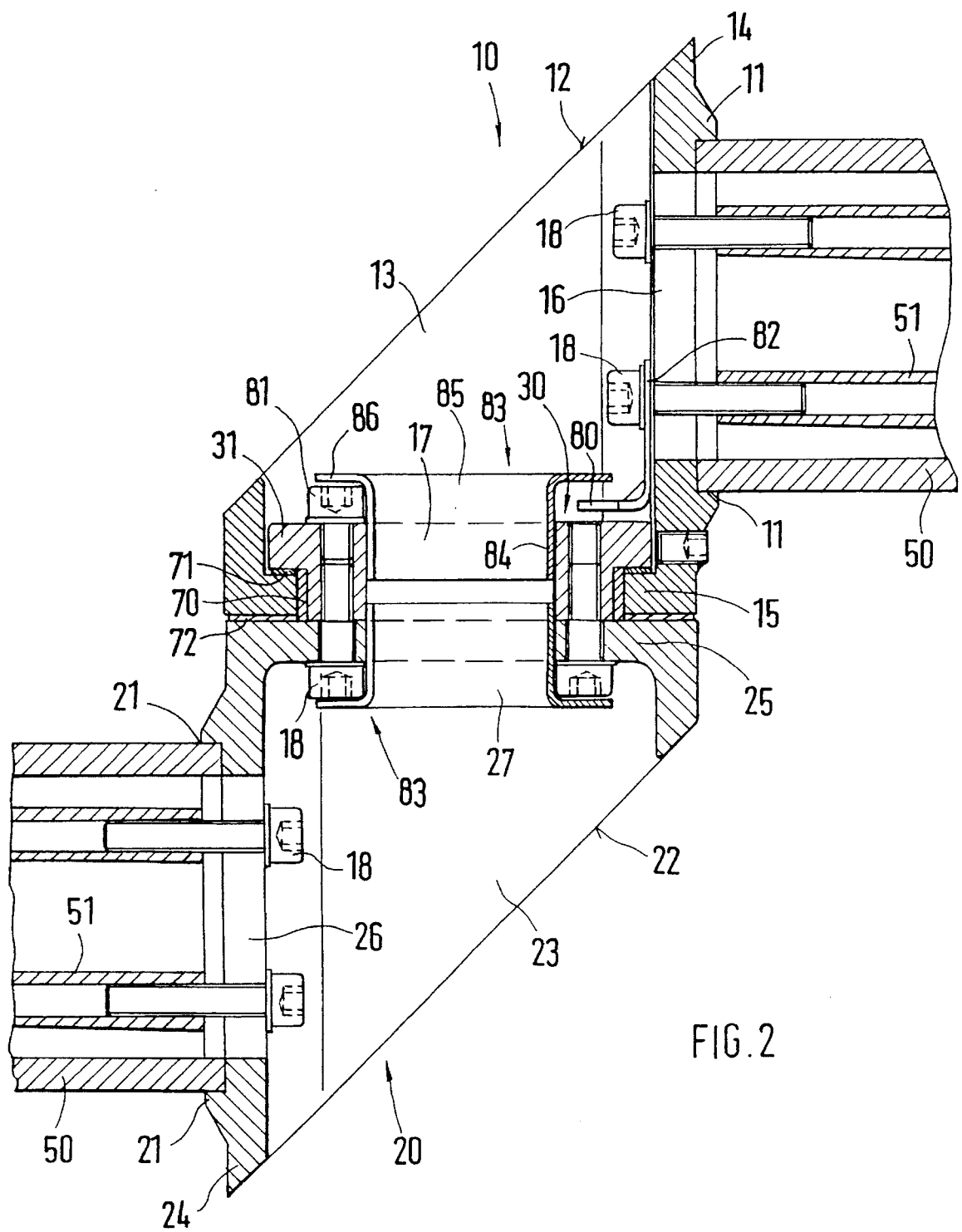
FIG. 2 is a longitudinal cross-sectional view of a hinge with a stop in accordance with one embodiment of this invention.

The hinge axes of the hinges are vertically oriented in FIG. 2. However, it is also possible to dispose them horizontally. This is required if, for example, the hinge is intended to be fastened on a ceiling.

The receptacles 11, 21 for the support arms 50 can also be embodied as recesses which have been cut into the support arm fastening wall 14, 24 to correspond with the cross section of the support arm 50.

A hinge in which a stop 80 is provided is shown in FIG. 2. The stop 80 is embodied as an angled piece and has two fastening receivers 82 in its vertically extending leg. Fastening screws 18 are inserted into the fastening receivers 82 of the stop and screwed into the screw conduits 51 of the support arm 50 by way of the hinge part 10 to fasten the stop 80 to the hinge. The stop 80 cooperates with necks 81 to limit pivotability of the hinge. The necks 81 are embodied as screws which are screwed into fastening receivers of the retaining ring 30. The necks 81 are fixedly connected to the second hinge part 20 by the retaining ring 30.

A plurality of fastening receivers are placed at equal distances on a portion of the circumference of the retaining ring 30. As a result, it is possible to screw the screws used as the necks 81 into the retaining ring 30 at different positions.

The necks 81 and the stop 80 are covered by a cover 83. The cover 83 has a neck 84 which is inserted into the cable passage 17 formed by the retaining ring 30. This prevents the cables which have been inserted through the cable passages 17, 27, from being squeezed between the necks 81 and the stop 80 and damaged. A further cover 83 which is structurally the same is inserted into the cable passage 27 of the hinge part 20 and covers the fastening screws 18. The covers 83 are embodied in the form of plastic rings provided with a lateral slot. In this way, it is later possible to mount the covers on an already finished mounted hinge. To do this, the cables are introduced through the slot into the opening 85 used as a cable passage. After that, the cover 83 with its neck 84 can be inserted into the retaining ring 30. The cover 83 has a recess 86 at its collar which adjoins the neck 84. The screw 81 can then be screwed out of the retaining ring 30 through the assembly chamber 13 of the hinged part 10 and through the recess 86, without it being necessary to remove the cover 83. The cover 83 can be turned in the retaining ring so that it can be respectively placed in a position above the neck 81, so that the tool opening of the latter becomes accessible. In this way, it is possible in a simple manner to remove the neck 81 and to screw it back into the retaining ring 30 at another position.

What is claimed is:

1. In a hinge comprising two hinge parts, each having at least one support wall, said hinge parts rotatably connected to each other by said support walls, and a support arm of a suspension device disposed on each of said support walls, wherein the hinge axis extends perpendicular to the longitudinal axis of the support arms, the improvement comprising:

each of the two hinge parts (10, 20) having a support arm fastening wall (14, 24), each support arm fastening wall (14, 24) and each support wall (15, 25) forming a cable passage (16, 17, 26, 27), the support arm fastening wall (14, 24) and the support wall (15, 25) of each of said two hinge parts (10, 20) being connected to each other by at least one lateral wall, the at least one lateral wall, the support arm fastening wall (14, 24) and the support wall (15, 25) of each of the two hinge parts forming an assembly chamber (13, 23) within each of the two hinge parts, each of the two assembly chambers (13, 23) having an opening (12, 22), each of the two assembly chambers (13, 23) accessible through the respective opening (12, 22), and the support arm fastening wall (14, 24) forming at least one fastening receiver into which a fastening screw (18) can be inserted from a direction of the assembly chamber (13, 23) and screwed into a screw receiver formed by a support arm (50).

2. In a hinge in accordance with claim 1, wherein the support arm fastening wall (24) of one of the hinge parts (20) comprises a flat connecting surface as a connecting flange for fastening the hinge on a wall (60) or a machine body.

3. In a hinge in accordance with claim 2, wherein the opening (12, 22) of each of the hinge parts (10, 20) is closed off by a cover (40).

4. In a hinge in accordance with claim 3, wherein the cover (40) is securable to the hinge parts (10, 20).

5. In a hinge in accordance with claim 4, wherein the support walls (15, 25) of the hinge parts (10, 20) form a pipe-shaped annular section.

6. In a hinge in accordance with claim 5, wherein the exterior of each of the support arm fastening walls (14, 24) of the hinged parts (10, 20) forms a receptacle (11, 21) in which an end of the support arm (50) can be fixed.

7. In a hinge in accordance with claim 6, further comprising a retaining ring (30) and a plurality of bearing rings (70, 71, 72), the retaining ring (30) comprising a neck inserted into the cable passage (17) of one of said hinge parts (10) and positively supported thereon by a collar (31), the retaining ring (30) forming at least one threaded receiver and, aligned therewith, the support wall (25) of the other of said hinge parts (20) forming at least one corresponding threaded receiver, and the two hinge parts (10, 20) connected to each other by at least one fastening screw (18).

8. In a hinge in accordance with claim 7, wherein the hinge comprises three of said bearing rings (70, 71, 72) which, in a vertical direction, respectively form a guided support between the collar (31) of the retaining ring (30) and the support wall (15) of the one of said hinge parts (10), between the support wall (15) of the one of said hinge parts (10) and the support wall (25) of the other of said hinge parts (20) and, in a horizontal direction, between the retaining ring (30) and the support wall (15) of the one of said hinge parts (10).

9. In a hinge in accordance with claim 8, wherein pivoting of the one of said hinge parts (10) in relation to the other of said hinge parts (20) is limited by a stop (80).

10. In a hinge in accordance with claim 9, wherein the stop (80) is affixed on one support arm fastening wall (14, 24) of the one of said hinge parts (10, 20) on a side facing away from the support arm (50), and at least one neck (81) is fixedly connected to the other of said hinge parts (10, 20) and cooperates with the stop (80).

11. In a hinge in accordance with claim 10, wherein the stop (80) embodied as an angle piece having at least one fastening receiver (82) into which a fastening screw (18) can be inserted is screwed into a screw receiver of the support arm (50).

12. In a hinge in accordance with claim 11, wherein the at least one neck (81) is embodied as a screw which is screwed into a threaded receiver of a retaining ring (30).

13. In a hinge in accordance with claim 12, wherein the screw and the stop (80) are closed off by a cover (83), the cover (83) having an annular neck (84) which is inserted into the retaining ring (30), and the cover (83) and the annular neck (84) forming a passage (85) for passing through a cable.

14. In a hinge in accordance with claim 13, wherein the cover (83) forms a recess (86) through which the necks (81) are individually accessible.

15. In a hinge in accordance with claim 13, wherein the cover (83) forms a slot.

16. In a hinge in accordance with claim 15, wherein the cover (83) forms a recess (86) through which the necks (81) are individually accessible.

17. In a hinge in accordance with claim 4, wherein the support walls of the hinge parts (10, 20) form a square hollow profiled section.

18. In a hinge in accordance with claim 17, wherein the exterior of each of the support arm fastening walls (14, 24) of the hinged parts (10, 20) forms a receptacle (11, 21) in which an end of the support arm (50) can be fixed.

19. In a hinge in accordance with claim 18, further comprising a retaining ring (30) and a plurality of bearing rings (70, 71, 72), the retaining ring (30) comprising a neck inserted into the cable passage (17) of one of said hinge parts (10) and positively supported thereon by a collar (31), the retaining ring (30) forming at least one threaded receiver and, aligned therewith, the support wall (25) of the other of said hinge parts (20) forming at least one corresponding threaded receiver, and the two hinge parts (10, 20) connected to each other by at least one fastening screw (18).

20. In a hinge in accordance with claim 19, wherein the hinge comprises three of said bearing rings (70, 71, 72) which, in a vertical direction, respectively form a guided support between the collar (31) of the retaining ring (30) and the support wall (15) of the one of said hinge parts (10), between the support wall (15) of the one of said hinge parts (10) and the support wall (25) of the other of said hinge parts (20) and, in a horizontal direction, between the retaining ring (30) and the support wall (15) of the one of said hinge parts (10).

21. In a hinge in accordance with claim 20, wherein pivoting of the one of said hinge parts (10) in relation to the other of said hinge parts (20) is limited by a stop (80).

22. In a hinge in accordance with claim 21, wherein the stop (80) is affixed on one support arm fastening wall (14, 24) of the one of said hinge parts (10, 20) on a side facing away from the support arm (50), and at least one neck (81) is fixedly connected to the other of said hinge parts (10, 20) and cooperates with the stop (80).

23. In a hinge in accordance with claim 22, wherein the stop (80) embodied as an angle piece having at least one fastening receiver (82) into which a fastening screw (18) can be inserted is screwed into a screw receiver of the support arm (50).

24. In a hinge in accordance with claim 23, wherein the at least one neck (81) is embodied as a screw which is screwed into a threaded receiver of a retaining ring (30).

25. In a hinge in accordance with claim 24, wherein the screw and the stop (80) are closed off by a cover (83), the cover (83) having an annular neck (84) which is inserted into the retaining ring (30), and the cover (83) and the annular neck (84) forming a passage (85) for passing through a cable.

26. In a hinge in accordance with claim 25, wherein the cover (83) forms a recess (86) through which the necks (81) are individually accessible.

27. In a hinge in accordance with claim 25, wherein the cover (83) forms a slot.

28. In a hinge in accordance with claim 27, wherein the cover (83) forms a recess (86) through which the necks (81) are individually accessible.

29. In a hinge in accordance with claim 1, wherein the opening (12, 22) of each of the hinge parts (10, 20) is closed off by a cover (40).

30. In a hinge in accordance with claim 29, wherein the cover (40) is securable to the hinge parts (10, 20).

31. In a hinge in accordance with claim 1, wherein the support walls (15, 25) of the hinge parts (10, 20) form a pipe-shaped annular section.

32. In a hinge in accordance with claim 1, wherein the support walls of the hinge parts (10, 20) form a square hollow profiled section.

33. In a hinge in accordance with claim 1, wherein the exterior of each of the support arm fastening walls (14, 24) of the hinged parts (10, 20) forms a receptacle (11, 21) in which an end of the support arm (50) can be fixed.

34. In a hinge in accordance with claim 1, further comprising a retaining ring (30) and a plurality of bearing rings (70, 71, 72), the retaining ring (30) comprising a neck inserted into the cable passage (17) of one of said hinge parts (10) and positively supported thereon by a collar (31), the retaining ring (30) forming at least one threaded receiver and, aligned therewith, the support wall (25) of the other of said hinge parts (20) forming at least one corresponding threaded receiver, and the two hinge parts (10, 20) connected to each other by at least one fastening screw (18).

35. In a hinge in accordance with claim 34, wherein the hinge comprises three of said bearing rings (70, 71, 72) which, in a vertical direction, respectively form a guided support between the collar (31) of the retaining ring (30) and the support wall (15) of the one of said hinge parts (10), between the support wall (15) of the one of said hinge parts (10) and the support wall (25) of the other of said hinge parts (20) and, in a horizontal direction, between the retaining ring (30) and the support wall (15) of the one of said hinge parts (10).

36. In a hinge in accordance with claim 34, wherein at least one neck (81) is embodied as a screw which is screwed into the at least one threaded receiver of the retaining ring (30).

37. In a hinge in accordance with claim 36, wherein the screw and a stop (80) are closed off by a cover (83), the cover (83) having an annular neck (84) which is inserted into the retaining ring (30), and the cover (83) and the annular neck (84) forming a passage (85) for passing through a cable.

38. In a hinge in accordance with claim 37, wherein the cover (83) forms a slot.

39. In a hinge in accordance with claim 37, wherein the cover (83) forms a recess (86) through which the necks (81) are individually accessible.

40. In a hinge in accordance with claim 1, wherein pivoting of the one of said hinge parts (10) in relation to the other of said hinge parts (20) is limited by a stop (80).

41. In a hinge in accordance with claim 1, wherein a stop (80) is affixed on one support arm fastening wall (14, 24) of the one of said hinge parts (10, 20) on a side facing away from the support arm (50), and at least one neck (81) is fixedly connected to the other of said hinge parts (10, 20) and cooperates with the stop (80).

42. In a hinge in accordance with claim 1, wherein a stop (80) embodied as an angle piece having at least one fastening receiver (82) into which a fastening screw (18) can be inserted is screwed into a screw receiver of the support arm (50).

* * * * *